(12) United States Patent
Bravo

(10) Patent No.: US 11,067,668 B1
(45) Date of Patent: Jul. 20, 2021

(54) SYSTEM, METHOD, AND COMPUTER PROGRAM PRODUCT FOR AUTOMATICALLY CONFIGURING A DETECTION DEVICE

(71) Applicant: Outsight SA, Paris (FR)

(72) Inventor: Raul Bravo, Paris (FR)

(73) Assignee: Outsight SA, Paris (FR)

( * ) Notice: Subject to any disclaimer, the term of this patent is extended or adjusted under 35 U.S.C. 154(b) by 0 days.

(21) Appl. No.: 16/780,080

(22) Filed: Feb. 3, 2020

(51) Int. Cl.
| | |
|---|---|
| *G01C 3/08* | (2006.01) |
| *G01S 7/48* | (2006.01) |
| *G01S 17/08* | (2006.01) |
| *G01S 17/88* | (2006.01) |
| *G08B 13/181* | (2006.01) |

(52) U.S. Cl.
CPC ............ *G01S 7/4802* (2013.01); *G01S 17/08* (2013.01); *G01S 17/88* (2013.01); *G08B 13/181* (2013.01)

(58) Field of Classification Search
CPC ........ G01S 7/4802; G01S 17/88; G01S 17/08; G08B 13/181
See application file for complete search history.

(56) References Cited

U.S. PATENT DOCUMENTS

| | | | |
|---|---|---|---|
| 8,577,611 B2 * | 11/2013 | Ma | G01S 17/89 702/2 |
| 10,267,918 B2 * | 4/2019 | LaChapelle | H01L 31/1085 |
| 2016/0061935 A1 * | 3/2016 | McCloskey | G01S 13/347 342/82 |
| 2017/0372602 A1 * | 12/2017 | Gilliland | G01S 17/66 |
| 2018/0136332 A1 * | 5/2018 | Barfield, Jr. | G06T 7/70 |
| 2018/0284274 A1 * | 10/2018 | LaChapelle | G01S 17/08 |
| 2020/0160071 A1 * | 5/2020 | Li | G01S 17/66 |
| 2020/0300973 A1 * | 9/2020 | Laski | G01S 17/931 |

* cited by examiner

*Primary Examiner* — Samantha K Abraham
(74) *Attorney, Agent, or Firm* — The Webb Law Firm

(57) ABSTRACT

A method, system, and computer program product is provided for automatically configuring a detection device. The method includes scanning, with a LiDAR device, a region to generate LiDAR data, analyzing the LiDAR data to determine a material classification for the region, determining a zone of interest within the region based on the material classification, the zone of interest comprising a subset of the region defined by a spatial boundary, monitoring the zone of interest with the detection device, identifying an event occurring within the spatial boundary of the zone of interest based on monitoring the region with the detection device, and in response to identifying the event occurring within the spatial boundary, automatically initiating at least one responsive action.

19 Claims, 9 Drawing Sheets

| Material | Component #1 | Component #2 | Component #3 | Component #4 |
|---|---|---|---|---|
| Snow | 1.9 | 0.9 | 0.9 | 0.9 |
| Ice | 0.8 | 0.5 | 0.5 | 0.5 |
| Cotton | 5.0 | 3.8 | 3.9 | 3.9 |
| Plastic | 1.5 | 1.1 | 1.4 | 0.7 |
| Asphalt | 2.0 | 4.0 | 2.1 | 2.1 |
| Skin | 5.0 | 2.1 | 2.7 | 1.9 |

# SYSTEM, METHOD, AND COMPUTER PROGRAM PRODUCT FOR AUTOMATICALLY CONFIGURING A DETECTION DEVICE

BACKGROUND

1. Field

This disclosure relates generally to detection devices and, in non-limiting embodiments, systems, methods, and computer program products for automatically configuring a detection device.

2. Technical Considerations

Video surveillance systems typically utilize wide-angle cameras that are positioned to capture a region to be monitored. However, the region to be monitored may be limited to a particular zone, such as an entrance area in a house, for the purpose of detecting a possible intrusion. With such existing surveillance systems, a user can manually define a surveillance zone with a configuration interface of the surveillance system. For instance, the Arlo® video surveillance system includes a configuration application to create user-defined zones. When a zone of interest is defined, the video feed can be processed to limit the bandwidth usage.

SUMMARY

According to non-limiting embodiments or aspects, provided is a method for automatically configuring a detection device, including: scanning, with a LiDAR device, a region to generate LiDAR data; analyzing, with at least one processor, the LiDAR data to determine a material classification for the region; determining, with at least one processor, a zone of interest within the region based on the material classification, the zone of interest comprising a subset of the region defined by a spatial boundary; monitoring the zone of interest with the detection device; identifying, with at least one processor, an event occurring within the spatial boundary of the zone of interest based on monitoring the region with the detection device; and in response to identifying the event occurring within the spatial boundary, automatically initiating, with at least one processor, at least one responsive action.

According to further non-limiting embodiments or aspects, provided is a system for automatically configuring a zone of interest, including: a LiDAR device; a detection device; and at least one processor in communication with the LiDAR device and the detection device, the at least one processor programmed or configured to: receive, from the LiDAR device, LiDAR data corresponding to a region; analyze the LiDAR data to determine a material classification for the region; determine a zone of interest within the region based on the material classification, the zone of interest comprising a subset of the region defined by a spatial boundary; monitor the region with the detection device; identify an event occurring within the spatial boundary of the zone of interest based on monitoring the region with the detection device; and in response to identifying the event occurring within the spatial boundary, automatically initiate at least one responsive action.

According to further non-limiting embodiments or aspects, provided is a computer program product for automatically configuring a detection device, including at least one non-transitory computer-readable medium including program instructions that, when executed by at least one processor, cause the at least one processor to: receive, from a LiDAR device, LiDAR data corresponding to a region; analyze the LiDAR data to determine a material classification for the region; determine a zone of interest within the region based on the material classification, the zone of interest comprising a subset of the region defined by a spatial boundary; monitor the region with the detection device; identify an event occurring within the spatial boundary of the zone of interest based on monitoring the region with the detection device; and in response to identifying the event occurring within the spatial boundary, automatically initiate at least one responsive action.

Other non-limiting embodiments or aspects will be set forth in the following numbered clauses:

Clause 1: A method for automatically configuring a detection device, comprising: scanning, with a LiDAR device, a region to generate LiDAR data; analyzing, with at least one processor, the LiDAR data to determine a material classification for the region; determining, with at least one processor, a zone of interest within the region based on the material classification, the zone of interest comprising a subset of the region defined by a spatial boundary; monitoring the zone of interest with the detection device; identifying, with at least one processor, an event occurring within the spatial boundary of the zone of interest based on monitoring the region with the detection device; and in response to identifying the event occurring within the spatial boundary, automatically initiating, with at least one processor, at least one responsive action.

Clause 2: The method of clause 1, wherein the LiDAR device comprises a multispectral LiDAR device, and wherein the LiDAR data comprises spectral LiDAR data.

Clause 3: The method of clauses 1 or 2, wherein the at least one responsive action comprises at least one of the following: generating a notification, communicating a notification, capturing at least one image, capturing at least one video, or any combination thereof.

Clause 4: The method of any of clauses 1-3, wherein the detection device comprises a video camera, and wherein determining the zone of interest comprises identifying a perimeter corresponding to the spatial boundary within a base image obtained from the video camera.

Clause 5: The method of any of clauses 1-4, wherein the detection device comprises the LiDAR device.

Clause 6: The method of any of clauses 1-5, wherein the material classification comprises values representing a plurality of different material compositions corresponding to a plurality of different portions of the region.

Clause 7: The method of any of clauses 1-6, wherein determining the zone of interest comprises identifying at least one portion of the region of the plurality of different portions of the region corresponding to at least one material composition of the plurality of different material compositions.

Clause 8: The method of any of clauses 1-7, wherein determining the zone of interest comprises determining a plurality of zones of interest, each zone of interest of the plurality of zones of interest corresponding to at least one different material composition of the plurality of different material compositions.

Clause 9: The method of any of clauses 1-8, further comprising: scanning the region with the LiDAR device to generate updated LiDAR data; analyzing, with at least one processor, the updated LiDAR data to determine an updated material classification for the region; and adjusting, with at least one processor, the spatial boundary of the zone of interest based on the updated material classification.

Clause 10: The method of any of clauses 1-9, wherein scanning the region with the LiDAR device comprises scanning the region using a first LiDAR device arranged in a first position and a second LiDAR device arranged in a second position different than the first position.

Clause 11: A system for automatically configuring a zone of interest, comprising: a LiDAR device; a detection device; and at least one processor in communication with the LiDAR device and the detection device, the at least one processor programmed or configured to: receive, from the LiDAR device, LiDAR data corresponding to a region; analyze the LiDAR data to determine a material classification for the region; determine a zone of interest within the region based on the material classification, the zone of interest comprising a subset of the region defined by a spatial boundary; monitor the region with the detection device; identify an event occurring within the spatial boundary of the zone of interest based on monitoring the region with the detection device; and in response to identifying the event occurring within the spatial boundary, automatically initiate at least one responsive action.

Clause 12: The system of clause 11, wherein the LiDAR device comprises a multispectral LiDAR device, and wherein the LiDAR data comprises spectral LiDAR data.

Clause 13: The system of clauses 11 or 12, wherein the detection device comprises a video camera, and wherein determining the zone of interest comprises identifying a perimeter corresponding to the spatial boundary within a base image obtained from the video camera.

Clause 14: The system of any of clauses 11-13, wherein the detection device comprises the LiDAR device.

Clause 15: The system of any of clauses 11-14, wherein the material classification comprises values representing a plurality of different material compositions corresponding to a plurality of different portions of the region.

Clause 16: The system of any of clauses 11-15, wherein determining the zone of interest comprises identifying at least one portion of the region of the plurality of different portions of the region corresponding to at least one material composition of the plurality of different material compositions.

Clause 17: The system of any of clauses 11-16, wherein determining the zone of interest comprises determining a plurality of zones of interest, each zone of interest of the plurality of zones of interest corresponding to at least one different material composition of the plurality of different material compositions.

Clause 18: The system of any of clauses 11-17, wherein the at least one processor is further programmed or configured to: scan the region with the LiDAR device to generate updated LiDAR data; analyze the updated LiDAR data to determine an updated material classification for the region; and adjust the spatial boundary of the zone of interest based on the updated material classification.

Clause 19: The system of any of clauses 11-18, wherein the LiDAR device comprises a first LiDAR device arranged in a first position and a second LiDAR device arranged in a second position different than the first position.

Clause 20: The system of any of clauses 11-19, wherein the at least one responsive action comprises at least one of the following: generating a notification, communicating a notification, capturing at least one image, capturing at least one video, or any combination thereof.

Clause 21: A computer program product for automatically configuring a detection device, comprising at least one non-transitory computer-readable medium including program instructions that, when executed by at least one processor, cause the at least one processor to: receive, from a LiDAR device, LiDAR data corresponding to a region; analyze the LiDAR data to determine a material classification for the region; determine a zone of interest within the region based on the material classification, the zone of interest comprising a subset of the region defined by a spatial boundary; monitor the region with the detection device; identify an event occurring within the spatial boundary of the zone of interest based on monitoring the region with the detection device; and in response to identifying the event occurring within the spatial boundary, automatically initiate at least one responsive action.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE PREFERRED EMBODIMENTS

Figure 1:
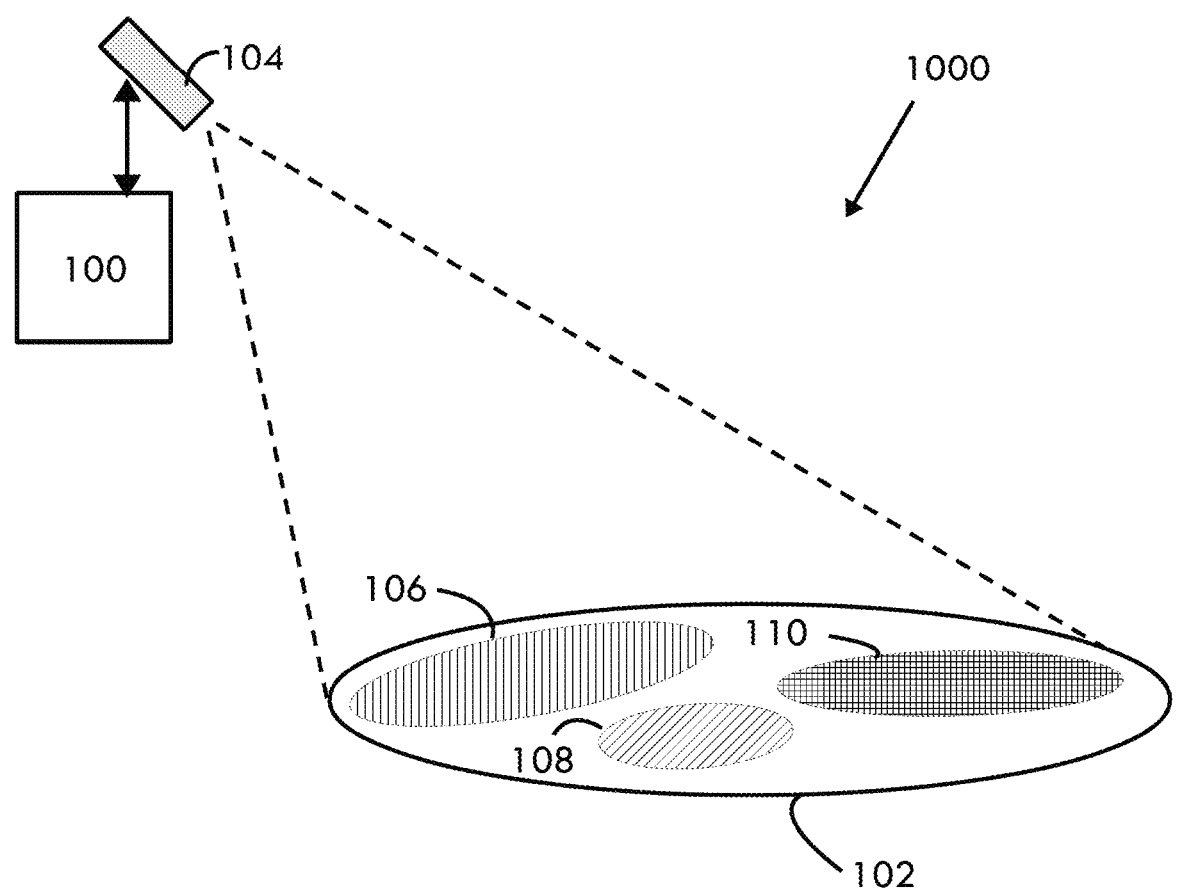
FIG. 1 is a schematic diagram of a system for automatically configuring a detection device according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data, such as a processor (e.g., a CPU, a microcontroller, and/or any other data processor). A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer.

As used herein, the term "server" may refer to or include one or more computing devices that are operated by or facilitate communication and/or processing for multiple parties in a network environment, such as the Internet, although it will be appreciated that communication may be facilitated over one or more public or private network environments and that various other arrangements are possible. Further, multiple computing devices (e.g., servers, other computing devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Referring now to FIG. 1, a system 1000 for automatically configuring a detection device is shown according to a non-limiting embodiment. FIG. 1 illustrates a region 102 in a field-of-view of a detection device 104. The detection device 104 is in communication with a computing device 100 that may be local to the detection device 104 or remote from the detection device 104 and in communication with the detection device 104 through one or more networks. The region 102 includes multiple zones of interest 106, 108, 110, which are represented as a spatial boundary defining an area. It will be appreciated that the region 102 and zones of interest 106, 108, 110 may be any shape and size. In the example shown in FIG. 1, the detection device 104 may include one or more video cameras for monitoring the region 102 for events occurring within a zone of interest 106, 108, 110. The zones of interest 106, 108, 110 may be defined by a boundary of pixels or coordinates in a field-of-view of the detection device 104. For example, the zones of interest 106, 108, 110 may be represented by a spatial boundary on a base image (e.g., a matrix of pixels) of the field-of-view.

In non-limiting embodiments, and with continued reference to FIG. 1, the zones of interest 106, 108, 110 may have different material compositions. In non-limiting embodiments, the zones of interest are automatically configured based on the different material compositions. For example, a LiDAR device (not shown separately in FIG. 1) may be used to generate LiDAR data from a field-of-view of the LiDAR device and, based on the LiDAR data, determine a material classification for the region 102. The LiDAR device may be a multispectral LiDAR device, a hyperspectral LiDAR device, and/or any device configured to generate spectral LiDAR data. In some non-limiting embodiments, the detection device 104 may also include the LiDAR device. For example, a detection device 104 may include both a LiDAR device and a video camera. In some non-limiting embodiments, the detection device may include a multispectral camera. The LiDAR data, which may include spectral data, may be processed by the computing device 100 to identify one or more sub-regions comprised of different material compositions. The sub-regions may be identified based on spatial boundaries encompassing the differing material compositions. In non-limiting embodiments, one or more sub-regions may be designated as zones of interest 106, 108, 110 based on the material classification for that sub-region matching one or more predetermined material compositions.

As used herein, the term "material classification" refers to an identification of one or more materials, such as data representing one or more materials, an object is comprised of. For example, a material classification may include one or more material compositions, one or more material properties, a material classification signature (e.g., a spectral signature) that corresponds to one or more material compositions or object types, one or more predefined object types (e.g., a driveway, a person, grass, etc.), spectral data associated with a material (e.g., wavelengths, spectral bands, colors, and/or the like), thermal properties of a material, and/or the like.

Suitable methods and systems for determining a material classification of one or more materials are described in International Patent Application No. PCT/EP2019/056842 filed on Mar. 19, 2019 by BEYOND SENSING, entitled "METHODS AND SYSTEMS FOR IDENTIFYING MATERIAL COMPOSITION OF OBJECTS," International Patent Application No. PCT/EP2019/056843 filed on Mar. 19, 2019 by BEYOND SENSING, entitled "METHODS AND SYSTEMS FOR IDENTIFYING MATERIAL COMPOSITION OF MOVING OBJECTS," U.S. patent application Ser. No. 16/675,016 filed on Nov. 5, 2019 by Raul Bravo and assigned to OUTSIGHT SA, entitled "Adaptive Active Safety System using Multi-spectral LIDAR," and U.S. patent application Ser. No. 16/735,452 filed on Jan. 6, 2020 by Raul Bravo and assigned to OUTSIGHT SA, entitled "Multi-spectral LIDAR Object Tracking," all of which are hereby incorporated by reference in their entirety.

Figure 2A:
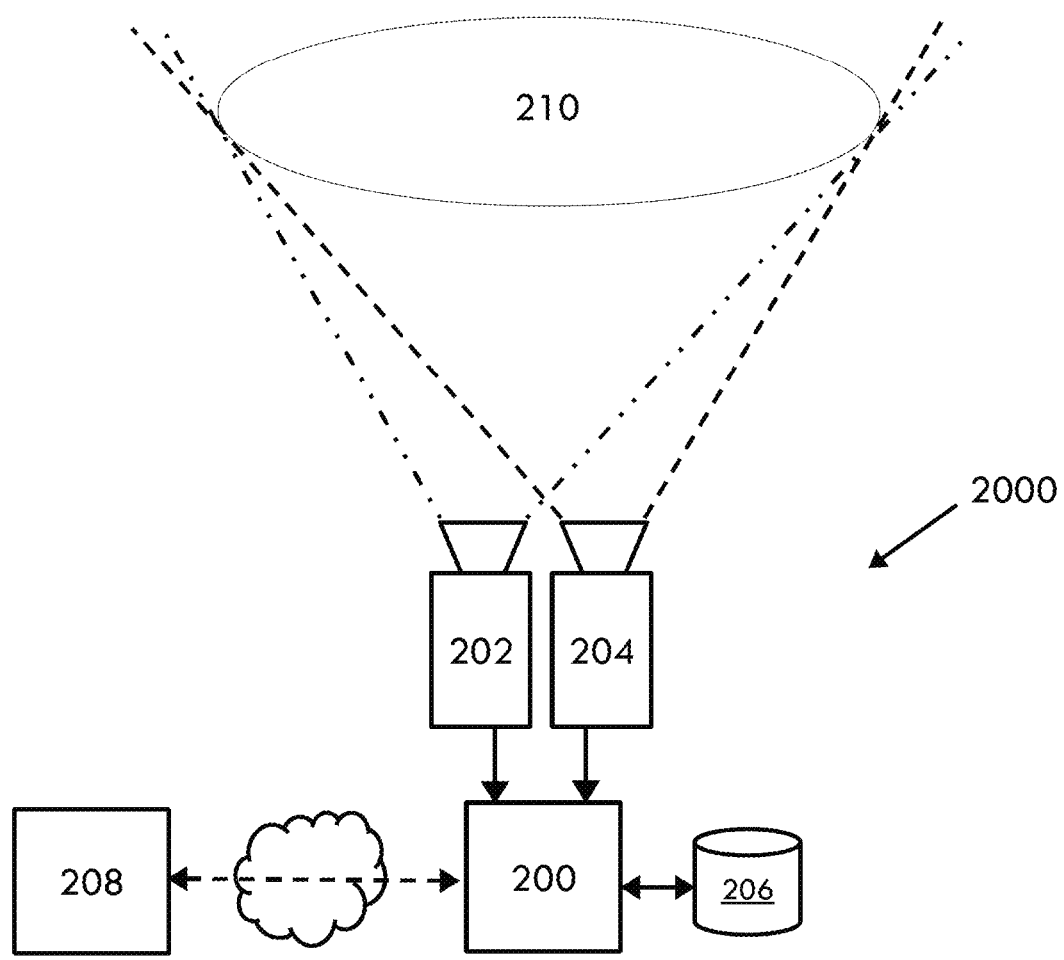
FIG. 2A is another schematic diagram of a system for automatically configuring a detection device according to a non-limiting embodiment.

Referring now to FIG. 2A, a system 2000 for automatically configuring a detection device is shown according to a non-limiting embodiment. The system 2000 includes a LiDAR device 202 having a field-of-view of a region 210 and a detection device 204 having a field-of-view of the region 210. The LiDAR device 202 may be a multispectral LiDAR device, a hyperspectral LiDAR device, and/or any device configured to generate spectral LiDAR data. In non-limiting embodiments, the fields-of-view of the devices 202, 204 are substantially overlapping. It will be appreciated that, in some non-limiting examples, the LiDAR device 202 may only be utilized for an initial configuration process and the detection device 204 may be used to monitor the region 210. For example, the LiDAR device 202 may be portable and used only for configuration or, in other implementations, may be arranged with the detection device 204 during monitoring. In other examples, the LiDAR device 202 and detection device 204 may be combined. Both the LiDAR device 202 and detection device 204 are in communication with a computing device 200. The computing device 200 is in communication with a data storage device 206 and a remote computing device 208 via a network. The data storage device 206 stores monitoring data including, for example, different material classifications, different detection events and associated responsive actions, configurations of the zones of interest based on pixels and/or coordinates, and/or other like data for facilitating the operation of the systems described herein.

With continued reference to FIG. 2A, in operation, the computing device 200 may cause the LiDAR device 202 to scan the region 210 to generate spectral LiDAR data. The computing device 200 may then process the spectral LiDAR data to determine different sub-regions of the region 210 that have differing material classifications (e.g., differ in material composition and/or properties) and that match predetermined material classifications for one or more materials stored in the data storage device 206. In non-limiting embodiments, the spectral LiDAR data includes wavelengths, intensities, and/or other properties of signals reflected from objects. For example, the computing device 200 may process the spectral LiDAR data to detect one or more wavelengths and/or properties of reflected signals that correspond to one or more material compositions. In such examples, one or more look-up tables, best-fit algorithms, machine-learning algorithms, and/or the like may be used to match portions of the LiDAR data to predefined material classifications. It will be appreciated that various distance metrics may be used to determine the similarity between material classifications determined from received signals and predefined material classifications.

In non-limiting embodiments, the material classification may be determined based on a material classification signature, such as a spectral signature, that is generated from LiDAR data for a range of wavelengths. For example, for a given zone of interest, a material classification signature may be generated and compared to a material classification signature database, which may include one or more look-up tables that correlate a plurality of different material classification signatures with one or more material classifications. Determining a material classification for a zone of interest may include, for example, determining a best match between the material classification signature generated from the LiDAR data for that zone of interest and values in the material classification signature database, even if there is not an exact match between values. The material classification signature database may be local and/or remote to the LiDAR device 202. In some examples, the material classification signature database may be preconfigured with known values and/or may be trained over time with continued usage and one or more machine learning techniques.

In non-limiting embodiments, the material classification signature is determined by measuring LiDAR signals reflected off objects through a plurality of filters where each filter selects a range of wavelengths. The range of wavelengths may be predefined and may each result in a component metric for a signature. In non-limiting embodiments, the signals transmitted and received by the LiDAR device may be infrared light having wavelengths in the range of 1000 nm to 2000 nm, although other wavelengths may be used. The combination of component metrics for each signal or set of signals reflected from an object may represent the material classification signature. Table 1 shows material classification signatures represented by four components for each of the following objects: snow, ice, cotton, plastic, asphalt, and skin.

TABLE 1

| Material | Component #1 | Component #2 | Component #3 | Component #4 |
| --- | --- | --- | --- | --- |
| Snow | 1.9 | 0.9 | 0.9 | 0.9 |
| Ice | 0.8 | 0.5 | 0.5 | 0.5 |
| Cotton | 5.0 | 3.8 | 3.9 | 3.9 |
| Plastic | 1.5 | 1.1 | 1.4 | 0.7 |
| Asphalt | 2.0 | 4.0 | 2.1 | 2.1 |
| Skin | 5.0 | 2.1 | 2.7 | 1.9 |

In non-limiting embodiments, each LiDAR signal received by the LiDAR device from reflecting off of an object is represented by a point. Each point may be represented by a vector based on one or more component metrics for ranges of wavelengths. In some non-limiting embodiments, the vector may be normalized to account for the distance between the reflecting object and the LiDAR device, because the signals may be weaker at a distance, and/or may be normalized to account for the atmospheric conditions, because some wavelengths may be absorbed by the atmosphere if, for example, there is fog or other weather conditions.

Figure 4A:
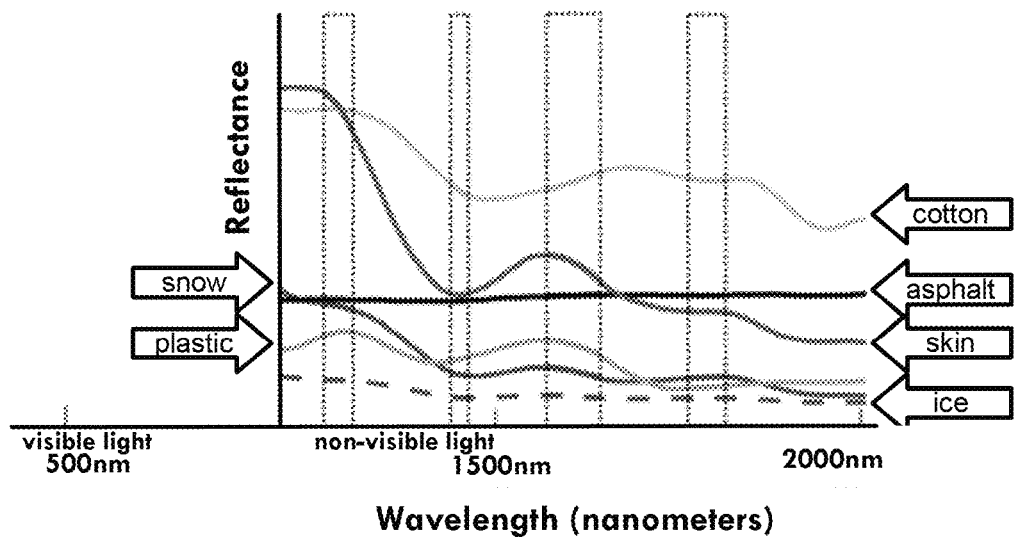
FIG. 4A is a chart representing LiDAR data according to a non-limiting embodiment.
Figure 4B:
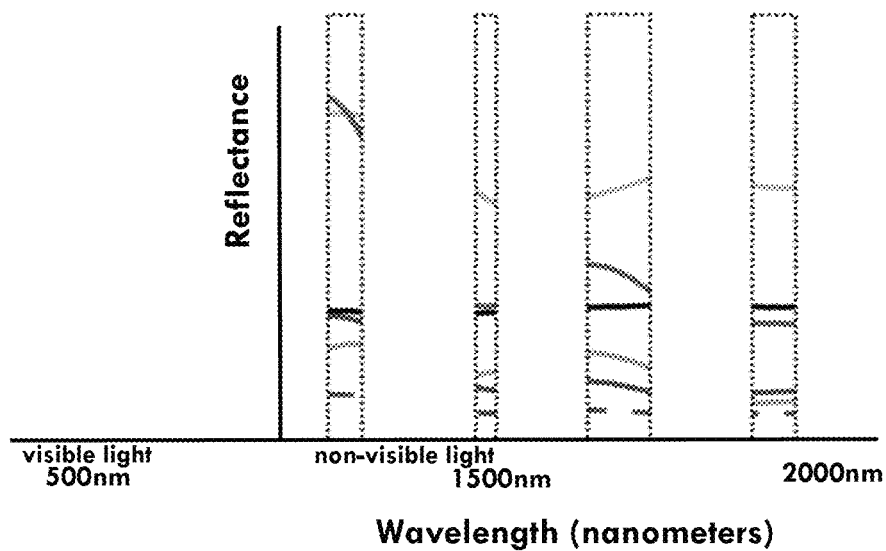
FIG. 4B is a chart representing components of a material classification signature according to a non-limiting embodiment.

Referring to FIG. 4A, a chart is shown representing LiDAR data reflected by multiple different objects according to a non-limiting embodiment. The lines in the chart respectively represent signals received from skin, cotton, snow, asphalt, plastic, and ice over a wavelength spectrum of 1000 nm to 2000 nm. The chart shown in FIG. 4A shows reflectance values on the Y-axis and wavelength values on the X-axis. Referring to FIG. 4B, a chart is shown with data selected from four ranges where each range represents a separate component metric of a material classification. As explained herein, each range may be based on a different filter. The reflectance intensities corresponding to each range of wavelengths are measured to form a multispectral signature that may be used as a material classification signature.

Still referring to FIG. 2A, the computing device 200 may store the zones of interest in the data storage device 206 as monitoring data. The computing device 200 may continually or continuously monitor the region with the detection device 204 by processing the data, such as video data, received from the detection device 204. The computing device 200 may monitor the region by detecting an event in the zone of interest. An event may be, for example, movement of an object within the zone of interest. In non-limiting embodiments, the event may be detected by comparing a baseline image of the zone of interest to one or more frames of the video data received during monitoring to determine if the baseline image and the frame(s) match. As an example, pixel values for the zone of interest represented in one or more frames of the video data may be compared to pixel values of a baseline image and, in response to determining that the values differ by more than a threshold amount, the computing device 200 may detect an event. It will be appreciated that the events may be configurable such that an event may require detection of movement for a predetermined amount of time (e.g., greater than one second). It will also be appreciated that various image processing techniques may be used to detect motion or another type of event within a zone of interest.

With continued reference to FIG. 2A, in response to the computing device 200 detecting an event within a zone of interest of the region 210, the computing device 200 may then determine a corresponding action. For example, the zone of interest in which an event is detected may be associated, in one or more data structures, with one or more corresponding actions to be performed in response to the event. In some examples, each zone of interest may be associated with one or more events and each event may be associated with one or more corresponding actions. In non-limiting embodiments, one or more rules may also be associated with the zone of interest, events, and/or actions. For example, an event may correspond to a first action if the event occurs at a first time or date and may correspond to a second action if the event occurs at a second time or date.

In non-limiting embodiments, and still referring to FIG. 2A, in response to determining one or more corresponding actions associated with a detected event, the computing device 200 may initiate such action(s). For example, the computing device 200 may communicate a notification (e.g., an alert, an alarm, a message, a voice communication, and/or the like) to a remote computing device 208. The remote computing device 208 may include a mobile device of a user and the notification may be a push notification, text message, automated phone call, and/or the like. The remote computing device 208 may include a server computer and the notification may be stored by the server in association with monitoring data such as, for example, a date and time of the event, a video clip of the event, an image of the event, and/or the like. In examples in which the remote computing device 208 is a server computer, the server computer may transmit a notification to one or more other devices, such as mobile devices in communication with the server computer.

In non-limiting embodiments, the region 210 may be scanned again with the LiDAR device 202 to generate updated LiDAR data. The region 210 may be scanned at predetermined intervals (e.g., every hour, every day, every week, every month, and/or the like). The region 210 may also be scanned in response to one or more events, such as movement or repositioning of the detection device 204. In non-limiting embodiments in which the LiDAR data and/or material classifications determined from the LiDAR data changes from previously-obtained LiDAR data and/or material classifications, the computing device 200 may adjust the spatial boundary associated with one or more zones of interest. For example, an updated scan of the region 210 may detect a smaller, larger, or differently-shaped zone of interest.

Figure 2B:
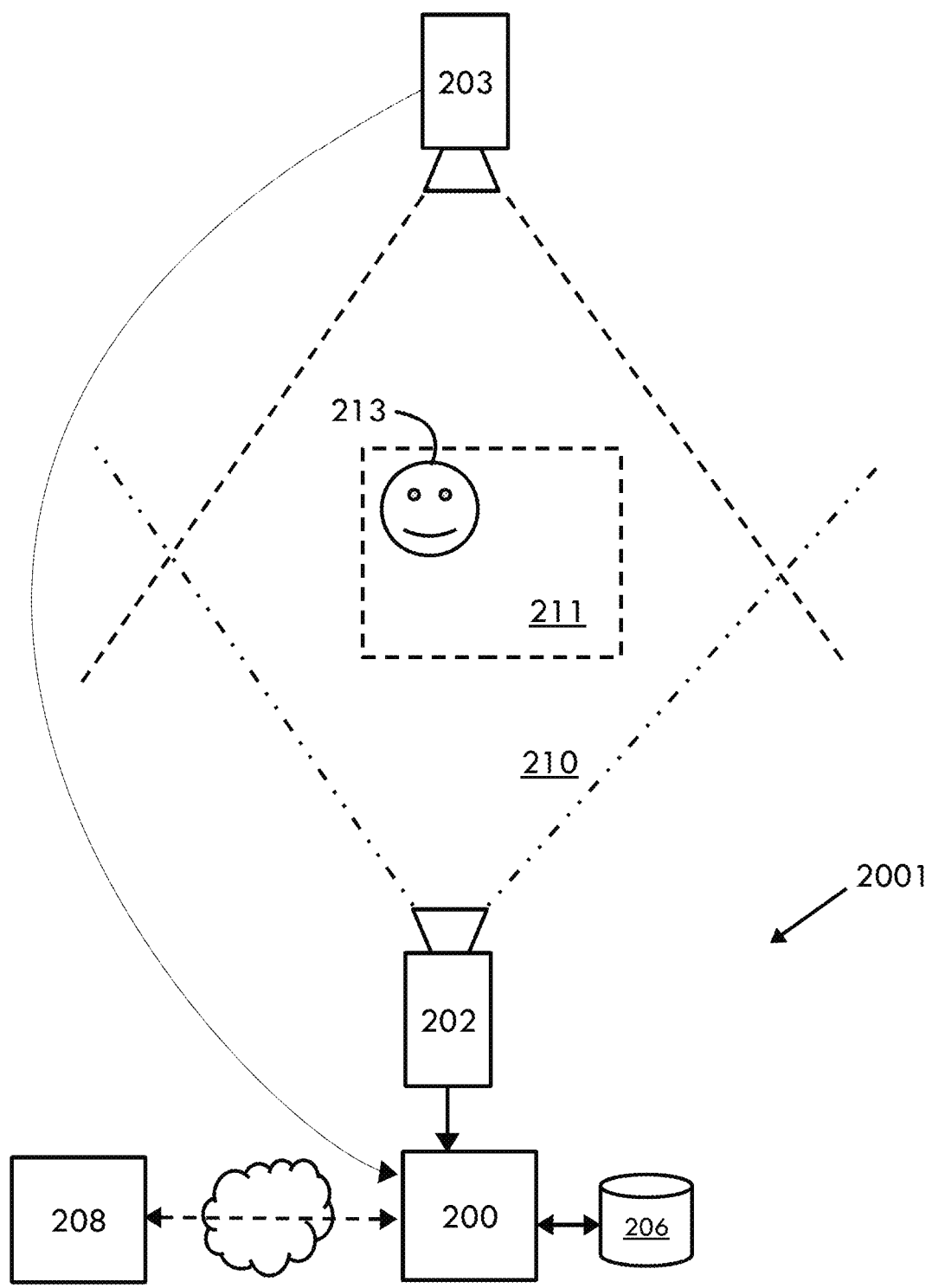
FIG. 2B is another schematic diagram of a system for automatically configuring a detection device according to a non-limiting embodiment.

Referring now to FIG. 2B, a system 2001 for automatically configuring a detection device is shown according to a non-limiting embodiment. In the embodiment illustrated in FIG. 2B, a second LiDAR device 203 is arranged in a different position than the LiDAR device 202. The second LiDAR device 203 may be positioned at the same or different angle as the LiDAR device 202 and may be positioned with a field-of-view including at least a portion of the region 210. As shown, the second LiDAR device 203 is in communication with the computing device 200, although it will be appreciated that the second LiDAR device 203 may be in communication with a different computing device (not shown in FIG. 2B) local or remote to the device 203 that is configured in a manner as described herein with respect to the computing device 200.

With continued reference to FIG. 2B, the region 210 includes a zone of interest 211. The zone of interest 211 may correspond to, for example, a floor covering (e.g., a carpet or mat) associated with a predefined material classification. The devices 202, 203 may scan the region 210 and detect the zone of interest 211 based on reflected signals. The reflected signals may be processed to determine a material classification for the region 210. Reflected signals having similar spectral properties may be grouped such that a spatial boundary can be identified surrounding the sub-region from which the signals are received. In the illustrated example, the computing device 200 may determine that signals reflected from the zone of interest 211 match (e.g., determined to be similar by at least a threshold amount) a predefined material classification, such as one or more material properties or material identifications or classes, associated with a floor covering. The zone of interest 211 may be stored in the data storage device 206 or elsewhere.

Still referring to FIG. 2B, a detection device, such as the LiDAR device 202, the LiDAR device 203, a video camera (not shown in FIG. 2B), and/or the like, may monitor the zone of interest 211 for an event, such as movement. An object or entity, such as an individual 213, may be detected within the zone of interest 211 on one or more frames of video data. In non-limiting embodiments, the zone of interest 211 may be monitored for intrusion by one or more individuals and may include, for example, an entrance to a building (e.g., steps, a door mat, pavement, and/or the like), a property boundary, a driveway, and/or the like.

In non-limiting embodiments, one or more GUIs may be generated to provide selectable options for a user to choose. For example, the computing device 200 may generate one or more GUIs for a computing device operated by a user, such as remote computing device 208, to facilitate the user to configure one or more zones of interest.

As an example, a GUI may be provided having one or more selectable options configured to allow a user to associate a zone of interest with one or more events to be detected. A GUI may also be provided having one or more selectable options configured to allow a user to associate an event with one or more corresponding actions. For example, a user may choose a zone of interest corresponding to a mat located in an entrance area of a building, may associate an intrusion event (e.g., detecting a body moving within the zone of interest) with the zone of interest, and may associate a notification with the intrusion event. In this manner, when an intruder is detected within the zone of interest, an alarm may be generated and communicated to one or more computing devices, lights and/or audible alarms may be activated in the region, video may be recorded, and/or the like.

In non-limiting embodiments, a zone of interest may be generated based on a computing device detecting a liquid, such as water, on a surface. As an example, a user may configure a zone of interest to correspond to a wet floor surface that may create dangerous conditions. A LiDAR device may scan the region including the wet floor surface and generate a spatial boundary surrounding the wet floor surface based on the material classification determined from the LiDAR data. The computing device may cause the LiDAR device to scan the region again at predetermined intervals, randomly, continually, continuously, or the like. In this manner, if the wet floor surface expands or contracts based on additional leaking, evaporation, clean-up, and/or the like, the computing device may then adjust the spatial boundary associated with the zone of interest accordingly. The computing device may, for example, record an event occurring on the wet floor surface (e.g., an individual moving), cause a notification to be transmitted in response to such an event, and/or cause another action in response to the event.

In non-limiting embodiments, a zone of interest may be generated based on a computing device detecting plant matter, such as grass. As an example, a user may configure a zone of interest to correspond to a grassy area that is protected from pedestrians and vehicles with signage or fencing. In non-limiting embodiments, the region including the grassy area may be scanned to generate a zone of interest surrounding the grass and scanned periodically to adjust the spatial boundary associated with the zone of interest if the grass grows in other areas.

In non-limiting embodiments, a zone of interested may be generated based on detecting a coating material (e.g., such as a clear or invisible paint) having known material properties (e.g., properties of reflected infrared light or ultraviolet light, as examples). In this manner, the coating material may be used to coat and/or paint areas, objects, and/or the like. In some non-limiting embodiments, the coating material may be applied to an article of clothing or other product in a retail store to allow for a surveillance system to monitor the products on the shelves (and to disregard empty shelves). In some non-limiting embodiments, the coating material may be washable such that it can be applied to articles of clothing.

In non-limiting embodiments, a zone of interest may include a region with exposed soil (e.g., dirt), a region fully covered by grass or another plant, and/or a region partially covered by grass or another plant. Such an arrangement may be used to manage livestock. For example, based on detecting one or more entities (e.g., livestock, such as cattle) or movements (e.g., movement of livestock) in a zone of interest corresponding to exposed soil or partial grass coverage, an action may be performed to move the livestock to an area with grass coverage. The action may include, for example, sending one or more notifications to a computing device associated with a livestock manager, automatically opening and/or closing one or more gates, and/or the like.

In non-limiting embodiments, a zone of interest may be a landing area for a drone or other vehicle. For example, a material (e.g., a floor covering, a coating material, and/or the like) may be used to designate a landing area that can be detected with a LiDAR device. A computing device, such as an on-board computer of a drone, may cause a LiDAR device on the vehicle to scan a region to detect the landing area. In this manner, the landing area can be moved or adjusted without reconfiguring the vehicle and the vehicle can identify the landing area at night, in low visibility, and/or in a crowded area (e.g., covered by trees and/or the like). Such an arrangement may be used for delivery drones, flying taxis, and/or any other vehicle equipped with a LiDAR device.

Figure 3:
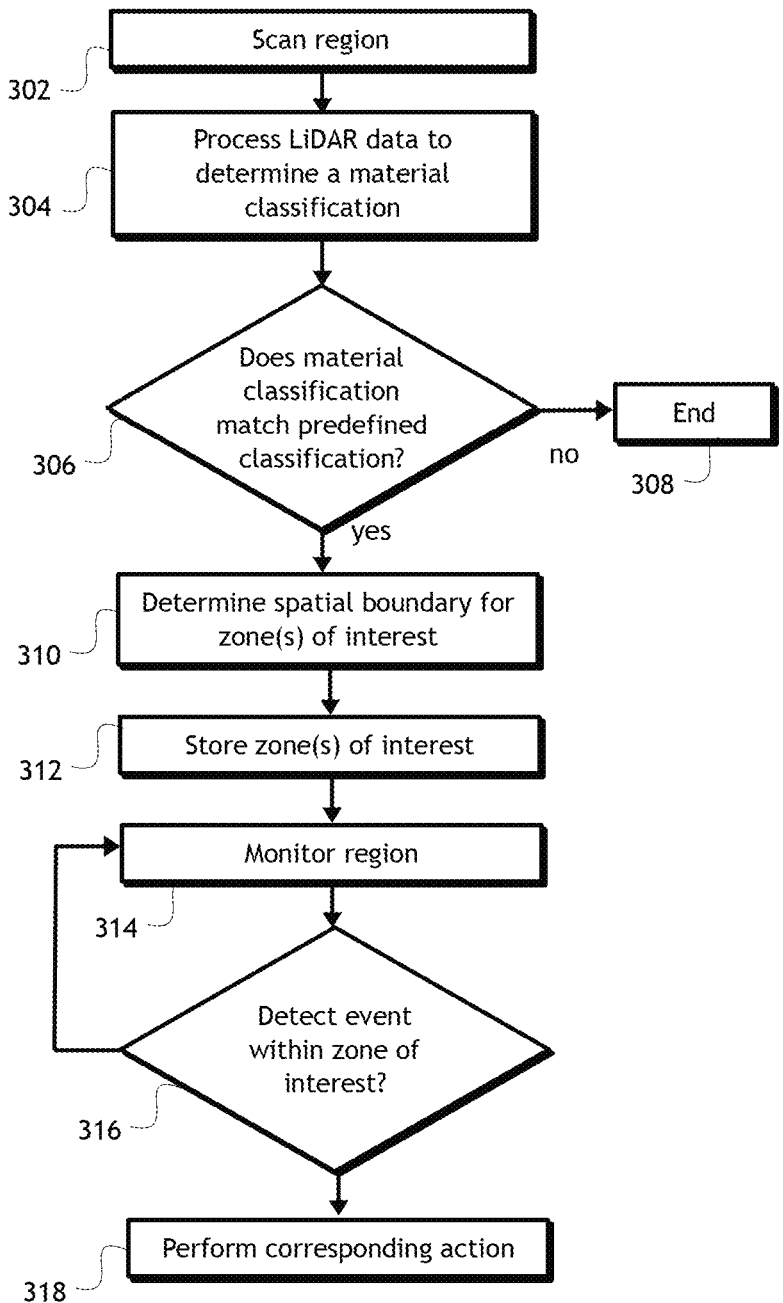
FIG. 3 is a flow diagram for a method for automatically configuring a detection device according to a non-limiting embodiment.

Referring now to FIG. 3, a flow diagram is shown according to a non-limiting embodiment. It will be appreciated that the steps and order of steps in FIG. 3 are for example purposes only and that the method may be performed with additional steps, fewer steps, and/or a different order of steps. At a first step 302, a region is scanned with a multispectral device, such as a multispectral or hyperspectral LiDAR device. At a next step 304, the multispectral data obtained at step 302 is processed to determine a material classification associated with the region. The material classification for the region may be grouped using, for example, one or more clustering techniques to identify groups of points defining a sub-region associated with a similar material classification. At step 306, the material classification associated with each identified sub-region is compared to one or more sets of predefined material classifications. As an example, it may be determined whether the detected material classification matches within a threshold of a predefined material classification. If the detected material classification for a sub-region is not a match, the method may end at step 308. If the detected material classification for a sub-region is a match, the method may proceed to step 310 in which a spatial boundary is determined for a zone of interest corresponding to the sub-region. At step 312, the zone of interest may be stored in a data storage device as a spatial boundary represented by geographic coordinates, pixel coordinates on an image, spatial coordinates on an image, and/or the like.

With continued reference to FIG. 3, at step 314 the region may be monitored with a detection device, such as a video camera. The monitoring may be continuous, continual, periodic, and/or the like. The monitoring may continue until an event is detected at step 316. As discussed herein, an event may include movement within the zone of interest such as an individual entering the zone of interest. In response to an event being detected at step 316, the method may proceed to step 318 in which an action may be performed. For example, one or more actions associated with the event(s) detected at step 316 may be identified from a database and a computing device may automatically perform that action(s).

Figure 5:
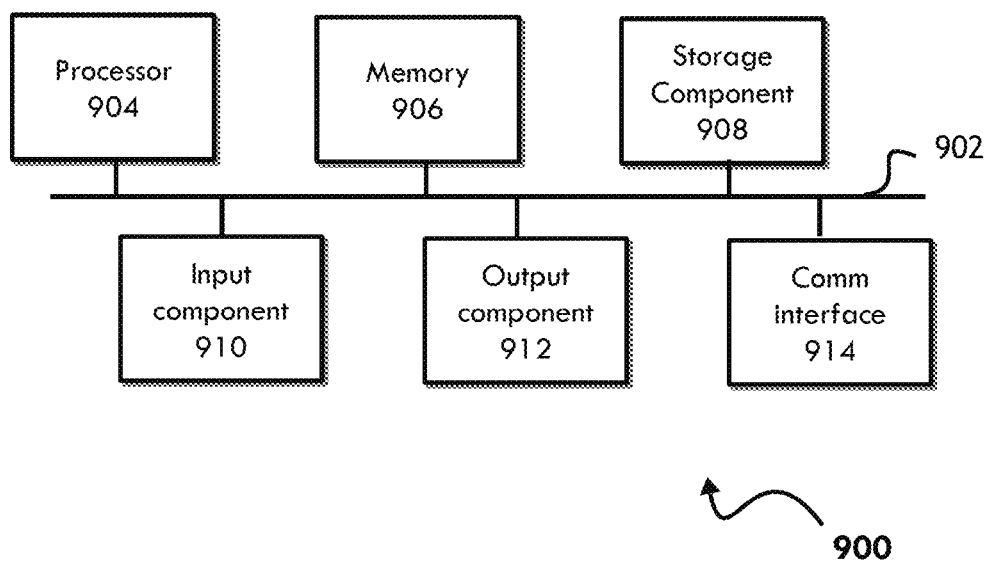
FIG. 5 illustrates example components of a device used in connection with non-limiting embodiments.

Referring now to FIG. 5, shown is a diagram of example components of a device 900 according to non-limiting embodiments. Device 900 may correspond to the computing device 100 in FIG. 1 and/or computing device 200 in FIGS. 2A and 2B, as examples. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 5. Additionally, or alternatively, a set of components (e.g., one or more components) of device 900 may perform one or more functions described as being performed by another set of components of device 900.

As shown in FIG. 5, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

In non-limiting embodiments, an environment is sampled to obtain LiDAR data regarding the environment. The LiDAR data can include a spectral response regarding a set of points in the environment and geometric information regarding points in the environment. The geometric information can include a location of those points relative to each other or relative to a common reference frame. The example of a multispectral LiDAR system is provided as an example of a sampling system that can obtain this information. However, the approaches disclosed herein are applicable to any system that can obtain spectral responses and geometric information regarding an environment.

Figure 6:
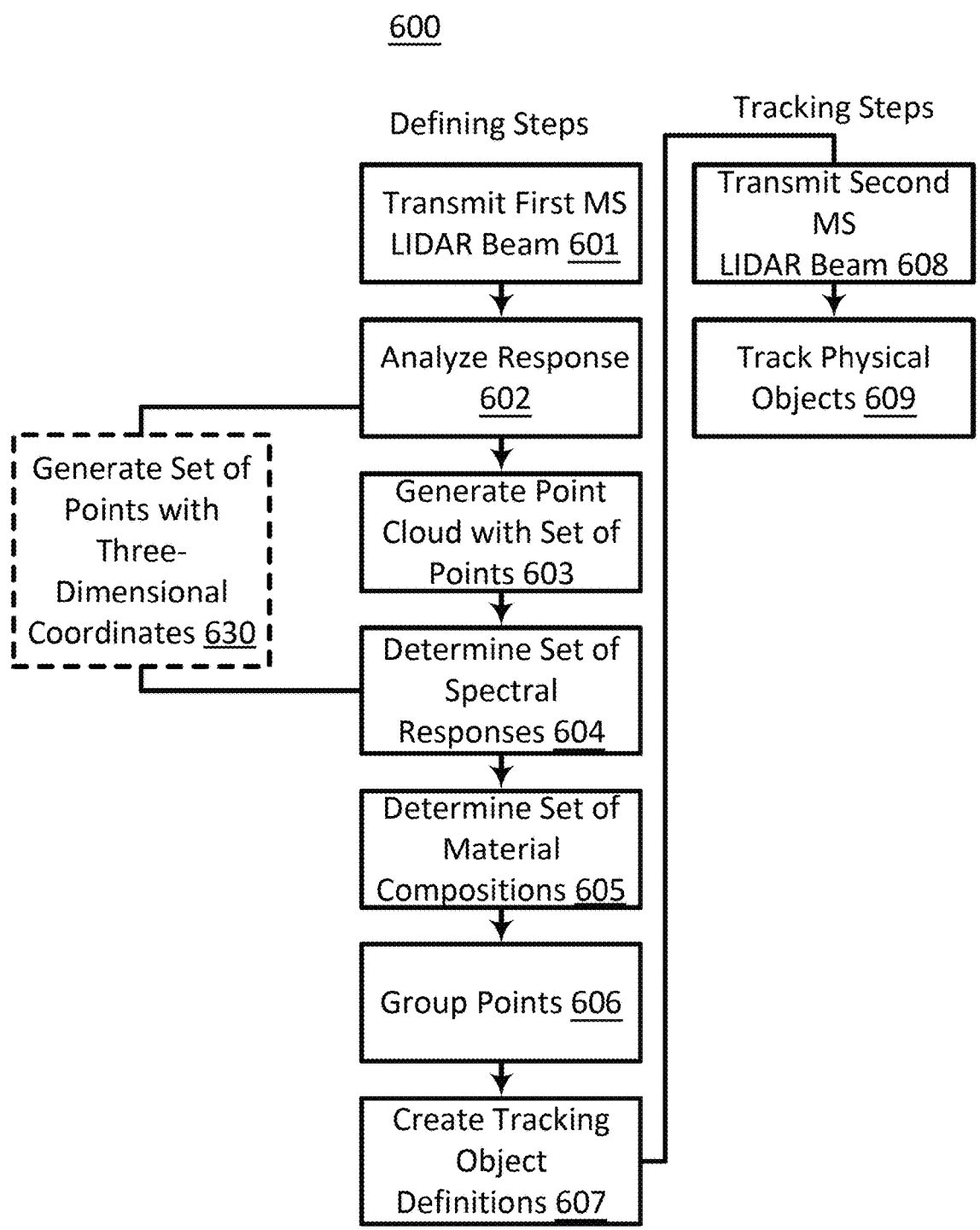
FIG. 6 illustrates a flow diagram for a set of methods for creating tracking object definitions and tracking objects using those definitions in accordance with non-limiting embodiments.

FIG. 6 includes a flow chart 600 for a set of methods for generating LiDAR data and processing the LiDAR data to identify one or more material classification signatures in accordance with non-limiting embodiments. It will be appreciated that the steps and order of steps in FIG. 6 are for example purposes only and that the method may be performed with additional steps, fewer steps, and/or a different order of steps. For example, the steps with dashed boundaries may not be performed. The flow chart begins with steps taken to sample and analyze the environment to obtain information regarding one or more physical objects, proceeds with steps taken to create one or more tracking object definitions (e.g., including a material classification signature and/or the like), and concludes with steps taken to track one or more physical objects using the one or more tracking object definitions. Flow chart 600 begins with steps taken to sample and analyze the environment to obtain information regarding one or more physical objects. The steps can be executed by a LiDAR device or other computing device. In the example of FIG. 6, flow chart 600 begins with step 601, in which a device transmits a multispectral light beam with a multispectral light beam transmitter of a LiDAR device.

Flow chart 600 continues with step 602 in which a response, of a photodetector, to a return of the multispectral light beam transmitted in step 601 is analyzed. The return of the light beam will include information regarding the properties of the object because the manner in which the light is reflected changes the properties of the light in a manner that depends on the properties of the object. The photodetector can include a single hardware element or multiple elements of a LiDAR device of a multispectral LiDAR system. The photodetector can be, for example, a broadband detector configured to detect light responsive to all the different wavelengths that can be emitted by the multispectral LiDAR system. Depending upon the characteristics of the signal transmitted in step 601, the photodetector can sense multiple signals sent at different times or analyze multiple spectra of light which are received at the same time. In non-limiting embodiments, a segmentation processing system is programmed to perform the analysis. The analysis can include determining an intensity of light reflected from an object, a phase shift of light reflected from an object, or a frequency shift of light reflected from an object. Depending upon the characteristics of the signal transmitted in step 601, the analysis can determine any of the variables mentioned above across multiple frequencies and/or intensities of light.

Flow chart 600 continues with step 603 in which, based on the analyzing of the response in step 602, a point cloud with a set of points is generated. In non-limiting embodiments, a set of points with three-dimensional coordinates is generated in step 630. In non-limiting embodiments, a segmentation processing system is programmed to conduct step 603. The segmentation processing system can conduct this action by conducting a time of flight analysis on the signals transmitted in step 601 and received in step 602 along with stored information regarding an angle at which the signals were transmitted. The analysis can include transmitting the signal at a known angle and at a known time and calculating a distance and location of the point at which the signal was reflected back to the transmitter using trigonometric and range finding calculations. The analysis can alternatively or additionally include conducting an angle of reception analysis in which an angle at which a signal is received in step 602 is directly measured, the angle of transmission of the signal in step 601 is a known value, and the distance separating the detector for step 602 and the transmitter for step 601 is used along with trigonometric calculations to determine the location of the point at which the signal was reflected back.

Figure 7:
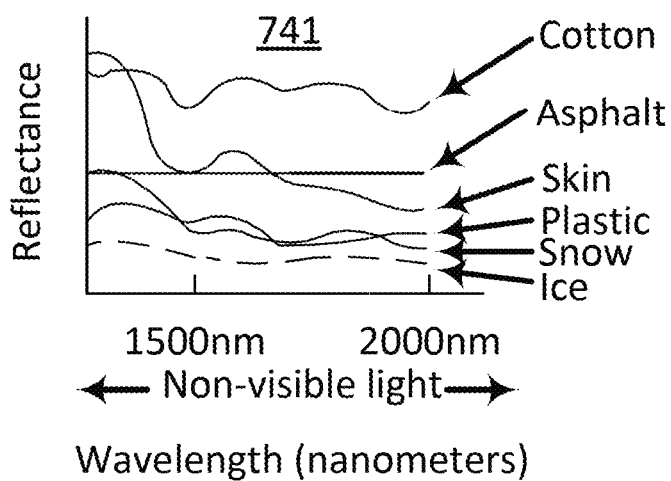
FIG. 7 illustrates a process for determining a spectral response for a set of points in accordance with non-limiting embodiments.
Figure 7:
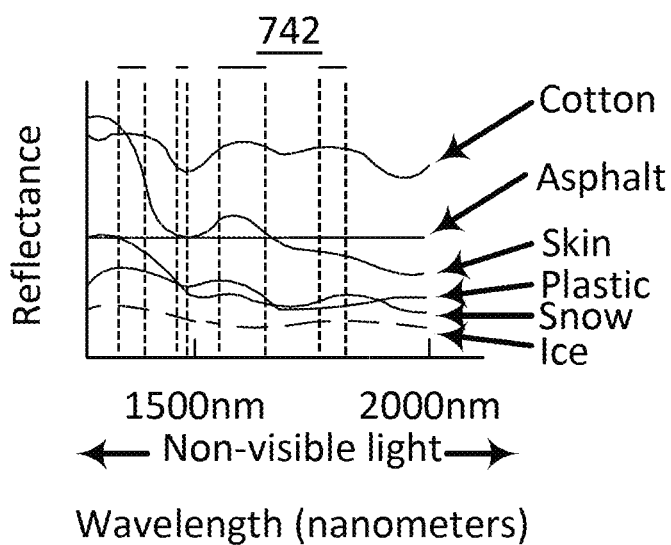
Figure 7:
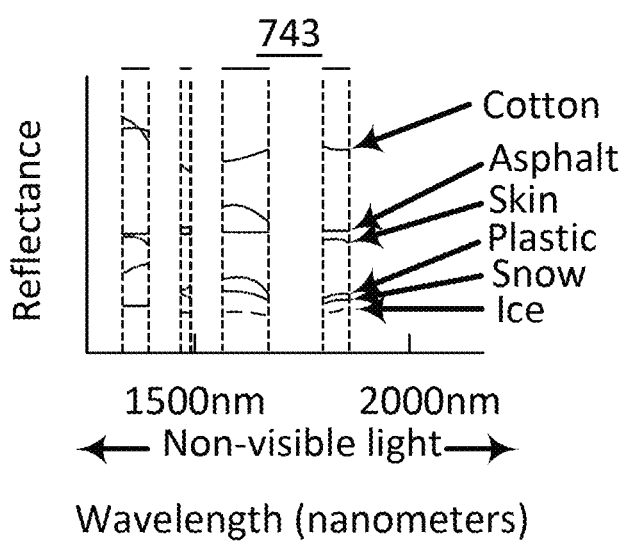

Flow chart 600 continues with step 604, in which, based on the analyzing of the response in step 602, a set of spectral responses of the set of points generated in step 603 is determined. FIG. 7 includes a process for determining a spectral response for a set of points in accordance with non-limiting embodiments disclosed herein. In the example of FIG. 7 and with reference to FIG. 6, a multispectral LiDAR system performs the process by first performing steps 601 through 603. In step 601, the multispectral LiDAR system transmits a multispectral light beam with a multispectral light beam transmitter. The multispectral light beam transmitter can transmit beams of light at multiple frequencies or a single beam comprising multiple frequencies. According to a non-limiting embodiment, the multispectral light beam transmitter emits infrared light in the 1000 nm to 2000 nm range. In step 602, the multi-spectral LiDAR system analyzes a response, of a photodetector, to a return of the multispectral light beam. A graph of a sample response is shown in graph 741.

FIG. 7 includes a flowchart 700 for a method for analyzing the response in accordance with non-limiting embodiments. Flowchart 700 begins and finishes with step 701 and would be conducted as a sub-step of step 602 in flow chart 600, in which analyzing the response includes applying a set of wavelength filters to the response. For example and as shown in graph 742, four ranges of wavelength filters can be applied to the response. In non-limiting embodiments, the set of wavelength filters includes a bandpass filter which passes infrared light. The intensity corresponding to each range of wavelength can be measured as part of the analyzing in step 602. Based on the analyzing, a set of spectral responses of the set of points can be determined in step 604. A graph of a sample set of spectral responses is shown in graph 743. In non-limiting embodiments, a segmentation processing system is programmed to determine the set of spectral responses of the set of points by conducting the steps illustrated in FIG. 7.

Figure 8:
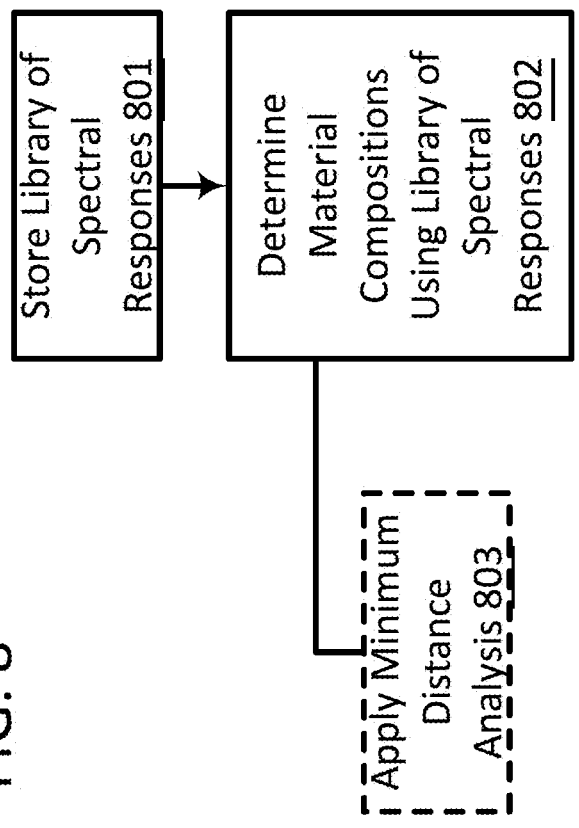
FIG. 8 illustrates a library of spectral responses that can be used to determine a material composition of a point in accordance with non-limiting embodiments.

Flowchart 600 continues with step 605, in which, based on the set of spectral responses of the set of points determined in step 604, a set of material compositions for the set of points is determined. FIG. 8 includes flowchart 800 for a set of methods for determining a material composition of a point by using a library of spectral responses in accordance with non-limiting embodiments. Flowchart 800 begins with step 801, in which a library of spectral responses is stored. In non-limiting embodiments, the library of spectral responses is stored in a memory of the system. FIG. 8 includes a table 850 that shows an example of a library of spectral responses for certain materials. The library can be generated based on observations conducted in a lab and can be hard coded into the system. Alternatively, the library could be stored in memory and could be updated via a network connection as additional materials are analyzed.

Flowchart 800 finishes with step 802, in which the library of spectral responses is used to determine the set of material compositions for the set of points. For example, determining the set of material compositions for the set of points can be done by looking up the set of spectral responses for the set of points using the library of spectral responses. The set of spectral responses can also be rounded prior to the lookup. Determining the set of material compositions for the set of points can also be done in other ways, including setting rules with thresholds. For example, if component one exceeded component four while component four was less than component three, the system could determine that the material composition of a point with that response was skin. Based on the number of materials in the library, the rules could be more complex. The spectra could also be selected based on a desire to minimize the complexity of the rules and further distinguish the materials. For example, the filters applied in step 701 could be selected to choose spectra that most clearly distinguishes a set of materials that the system is being optimized to filter and track. In non-limiting embodiments, a segmentation processing system is programmed to determine the set of material compositions for the set of points using the rules and processes described above.

In non-limiting embodiments, the set of spectral responses detected by the LiDAR device or other computing device is a set of spectral response vectors, and the library of spectral responses stored in step 801 is a library of spectral response vectors. In these embodiments, determining the set of material compositions for the set of points in step 802 could then include applying minimum distance analysis to a set of spectral response vectors in the library of spectral response vectors as in sub-step 803.

In non-limiting embodiments, the set of spectral responses of the set of points in the point cloud is normalized into a set of normalized spectral responses before determining the set of material compositions for the set of points using the set of normalized spectral responses. A set of spectral responses can be normalized to account for the distance of the reflecting object because objects at a greater distance return a lower spectral response. The geometric information obtained regarding the points can be utilized in the associated routines. Similarly, a set of spectral responses can be normalized to account for atmospheric conditions (such as fog) that can also lower an object's spectral response. Wavelengths that are more susceptible to the atmospheric condition can thereby be adjusted up or down to counteract the bias introduced by the condition. The atmospheric condition can be detected by a separate system such as a visible light camera or a connection to an external network with knowledge of the position of the detection device and the local conditions of that position (e.g., an Internet weather monitoring system). In non-limiting embodiments, the atmospheric conditions can be detected using the same detection device during a calibration step which targets a known surface such as a calibration target. The calibration target could be positioned within the range of the detection device such as on a vehicle the detection device was located on. In non-limiting embodiments, the set of spectral responses of the set of points in the point cloud is normalized into a set of normalized spectral responses after detecting the atmospheric condition, and the determining of the set of material compositions for the set of points uses the set of normalized spectral responses that have been normalized based on the atmospheric condition.

Flow chart 600 continues with step 606, in which, based on both (i) the set of material compositions from step 605 and (ii) a geometric aspect of the set of points, the set of points is grouped into one or more groups. A geometric aspect of a set of points can be any geometric factor related to the points. For example, the aspect could be a set of distances between the set of points determined by calculating the distance between the points in the point cloud generated in step 603. As another example, the geometric aspect could be a shape outlined by the set of points or an edge defined by the set of points. Regardless, grouping the set of points into one or more groups can be done with algorithms that take into account geometric aspects of the points as well as material compositions. For example, a human hand in contact with an aluminum trash can could be grouped as a separate object even if the objects were in contact while the head and hind quarters of a dog could be grouped together even if the body of the dog were occluded and the two objects appeared to be geometrically separate.

In non-limiting embodiments, points are grouped using various approaches. The set of material compositions and the geometric aspect of the set of points can be combined in different ways to group the set of points into one or more groups. In one set of approaches, the values for material compositions and geometry can be treated separately with one set of data being used to create constraints for analyzing the other set. For example, one approach could involve setting a threshold for material composition variation across a set distance (i.e., a large change in material composition over a short distance indicates a change in objects). In another set of approaches, values for material compositions and geometry can be combined prior to grouping. For example, a fixed value could be assigned for the response of a point to the various spectra and the set of fixed values is treated as coordinates in X dimensional space along with the x, y, z location coordinates. Various grouping techniques can be applied to a combined data set or with one data set setting the constraints for grouping the other data set. These techniques can include but are not limited to thresholding, edge detection, nearest neighbor, and branching algorithms. For example, all contiguous points with the same material composition, or nearly the same material composition within a certain threshold, can be grouped. As another example, all points forming a contour or boundary of an object and having the same material composition can be grouped. As another example, points with the same material composition can be grouped when they are part of certain geometric aspects (e.g., when an object is in motion) but not when they are part of other geometric aspects (e.g., when an object is at rest). The spectra and geometric aspect data can be normalized prior to the execution of those techniques. In non-limiting embodiments, a segmentation processing system is programmed to group the set of points into one or more groups.

In non-limiting embodiments, the tracking object definitions identify specific and unique objects without conducting a classification or recognition of the object. The one or more tracking object definitions can be one or more generic object definitions, and the steps used to generate the tracking object definitions do not have to include any classification of the tracked objects. Similarly, the step of grouping points in the set of points into one or more groups can only use the set of material compositions and the set of distances, and the step of tracking one or more physical objects does not include any classification of the one or more physical objects. In these non-limiting embodiments, the creation of the tracking object definitions and the usage of those definitions to track objects can be conducted at higher speeds, at least in part because there is no need to provide the data to a classifier, and with a sparser data set as compared to approaches in which objects are analyzed and broken into specific categories.

Flow chart 600 continues with step 607, in which tracking object definitions are created using the one or more groups from step 606. As mentioned in the prior paragraph, this process can be executed without conducting a classification. For example, step 607 can include assigning a generic but unique string of characters to a group of points as grouped in the execution of step 606 and saving the resulting association and definition to memory for purposes of tracking the object. Alternatively, this process can include a classification step in which an object is recognized as belonging to a specific class of objects (e.g., human, car, animal, bike, etc.). The process can be conducted by providing the spectral response and geometric aspect of a given group to a classifier that has been configured to identify a set of classes. A segmentation processing system can be programmed to create the one or more tracking object definitions by including such a classifier or by being a simple script for assigning unique strings to groups.

Flow chart 600 continues with step 608, in which a device transmits a second multispectral light beam with a multispectral light beam transmitter. The second multispectral light beam is transmitted after transmitting the first multispectral light beam in step 601. The transmitter can be the same transmitter used for step 601 or a different transmitter. Flow chart 600 finishes with step 609, in which one or more physical objects are tracked using (i) a response of a photodetector to the second multispectral light beam; and (ii) the one or more tracking object definitions from step 607. An object can be matched with a tracking object definition using machine learning algorithms including but not limited to fuzzy logic, function approximators, and deep net algorithms. The one or more objects can be tracked across a series of frames of input (e.g., video) provided to the object tracking system. The tracking object definition corresponding with a unique and specific object can change from frame to frame as the object's geometry relative to a detection device changes. In these approaches, the definitions from step 607 can be periodically or continuously updated at the same time the tracking of the associated objects is taking place through the execution of step 609. In non-limiting embodiments, a tracking processing system is programmed to track the one or more physical objects. The tracking processing system can obtain geometric and spectral response information from a response to the second light beam and analyze that information in light of the tracking object definitions that were previously generated by the overall system. For example, the information can be applied as an input to a classifier where the classes of the classifier are the tracking object definitions previously generated by the system. If the classifier outputs a probability over a certain threshold for a given class, the system would recognize the response of the second light beam as illuminating the tracking object associated with that class. In non-limiting embodiments, usage of both a geometric aspect and spectral response of a set of points in order to define a tracking object provides certain benefits such as the ability to distinguish and continue to track objects that have merged or objects that have been occluded and then must be retracked after emerging.

The one or more tracking object definitions can include two different tracking object definitions corresponding with two unique and specific physical objects. The two objects can be separately tracked by the tracking system even if they are contiguous in a point cloud illuminated by the detection device as the two objects have different material compositions. The set of material compositions can also include two different material compositions corresponding with the two objects. For example, one of the objects can have a material composition of 19% skin material, 78% cotton material, and 3% unknown material, and the second of the objects can have a material composition of 93% plastic material, 2% aluminum, and 5% unknown material. When the two objects' point clouds become contiguous (i.e., the two objects have merged or come into contact with each other), tracking the two objects in step 609 can include separately tracking each of the objects based on its tracking object definition and material composition. In non-limiting embodiments, a tracking processing system is programmed to track the two objects.

In non-limiting embodiments, a second multispectral light beam is transmitted after transmitting the first multispectral light beam in step 601. The second multispectral light beam can be transmitted with a LiDAR device of a multispectral LIDAR system. Using a response of a photodetector to a return of the second multispectral light beam and the one or more tracking object definitions, it can be determined that one or more physical objects are occluded. In non-limiting embodiments, a tracking processing system is programmed to transmit, with the LiDAR device of a multispectral LIDAR system, a second multispectral light beam and to determine that one or more of the physical objects are occluded. This can occur if, for example, none of the groups of points illuminated by the second light beam is found to be sufficiently similar to one of the stored tracking object definitions.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for automatically configuring a detection device, comprising:
scanning, with a multispectral LiDAR device, a region to generate multispectral LiDAR data;
analyzing, with at least one processor, the multispectral LiDAR data to determine a material classification for the region based on a spectral signature;
determining, with at least one processor, a zone of interest within the region based on the material classification, the zone of interest comprising a subset of the region;
generating, with at least one processor, a spatial boundary surrounding the zone of interest;
storing the spatial boundary in a data storage device;
monitoring the zone of interest with the detection device based on the spatial boundary;
identifying, with at least one processor, an event occurring within the spatial boundary of the zone of interest based on monitoring the region with the detection device; and
in response to identifying the event occurring within the spatial boundary, automatically initiating, with at least one processor, at least one responsive action.

2. The method of claim 1, wherein the at least one responsive action comprises at least one of the following: generating a notification, communicating a notification, capturing at least one image, capturing at least one video, or any combination thereof.

3. The method of claim 1, wherein the detection device comprises a video camera, and wherein determining the zone of interest comprises identifying a perimeter corresponding to the spatial boundary within a base image obtained from the video camera.

4. The method of claim 1, wherein the detection device comprises the multispectral LiDAR device.

5. The method of claim 1, wherein the material classification comprises values representing a plurality of different material compositions corresponding to a plurality of different portions of the region.

6. The method of claim 5, wherein determining the zone of interest comprises identifying at least one portion of the region of the plurality of different portions of the region corresponding to at least one material composition of the plurality of different material compositions.

7. The method of claim 5, wherein determining the zone of interest comprises determining a plurality of zones of interest, each zone of interest of the plurality of zones of interest corresponding to at least one different material composition of the plurality of different material compositions.

8. The method of claim 1, further comprising:
scanning the region with the multispectral LiDAR device to generate updated multispectral LiDAR data;
analyzing, with at least one processor, the updated multispectral LiDAR data to determine an updated material classification for the region; and
adjusting, with at least one processor, the spatial boundary of the zone of interest based on the updated material classification.

9. The method of claim 1, wherein scanning the region with the multispectral LiDAR device comprises scanning the region using a first LiDAR device arranged in a first position and a second LiDAR device arranged in a second position different than the first position.

10. A system for automatically configuring a zone of interest, comprising:
a multispectral LiDAR device;
a detection device; and
at least one processor in communication with the multispectral LiDAR device and the detection device, the at least one processor programmed or configured to:
receive, from the multispectral LiDAR device, multispectral LiDAR data corresponding to a region;

analyze the multispectral LiDAR data to determine a material classification for the region based on a spectral signature;

determine a zone of interest within the region based on the material classification, the zone of interest comprising a subset of the region;

generate a spatial boundary surrounding the zone of interest;

storing the spatial boundary in a data storage device;

monitor the region with the detection device based on the spatial boundary;

identify an event occurring within the spatial boundary of the zone of interest based on monitoring the region with the detection device; and in response to identifying the event occurring within the spatial boundary, automatically initiate at least one responsive action.

11. The system of claim 10, wherein the detection device comprises a video camera, and wherein determining the zone of interest comprises identifying a perimeter corresponding to the spatial boundary within a base image obtained from the video camera.

12. The system of claim 10, wherein the detection device comprises the multispectral LiDAR device.

13. The system of claim 10, wherein the material classification comprises values representing a plurality of different material compositions corresponding to a plurality of different portions of the region.

14. The system of claim 13, wherein determining the zone of interest comprises identifying at least one portion of the region of the plurality of different portions of the region corresponding to at least one material composition of the plurality of different material compositions.

15. The system of claim 13, wherein determining the zone of interest comprises determining a plurality of zones of interest, each zone of interest of the plurality of zones of interest corresponding to at least one different material composition of the plurality of different material compositions.

16. The system of claim 10, wherein the at least one processor is further programmed or configured to:

scan the region with the multispectral LiDAR device to generate updated multispectral LiDAR data;

analyze the updated multispectral LiDAR data to determine an updated material classification for the region; and adjust the spatial boundary of the zone of interest based on the updated material classification.

17. The system of claim 10, wherein the multispectral LiDAR device comprises a first LiDAR device arranged in a first position and a second LiDAR device arranged in a second position different than the first position.

18. The system of claim 10, wherein the at least one responsive action comprises at least one of the following: generating a notification, communicating a notification, capturing at least one image, capturing at least one video, or any combination thereof.

19. A computer program product for automatically configuring a detection device, comprising at least one non-transitory computer-readable medium including program instructions that, when executed by at least one processor, cause the at least one processor to:

receive, from a multispectral LiDAR device, multispectral LiDAR data corresponding to a region;

analyze the multispectral LiDAR data to determine a material classification for the region based on a spectral signature;

determine a zone of interest within the region based on the material classification, the zone of interest comprising a subset of the region;

generate a spatial boundary surrounding the zone of interest;

storing the spatial boundary in a data storage device;

monitor the region with the detection device based on the spatial boundary;

identify an event occurring within the spatial boundary of the zone of interest based on monitoring the region with the detection device; and in response to identifying the event occurring within the spatial boundary, automatically initiate at least one responsive action.

* * * * *